(No Model.) C. HAMANN. 3 Sheets—Sheet 2.
SHEARS.
No. 492,198. Patented Feb. 21, 1893.
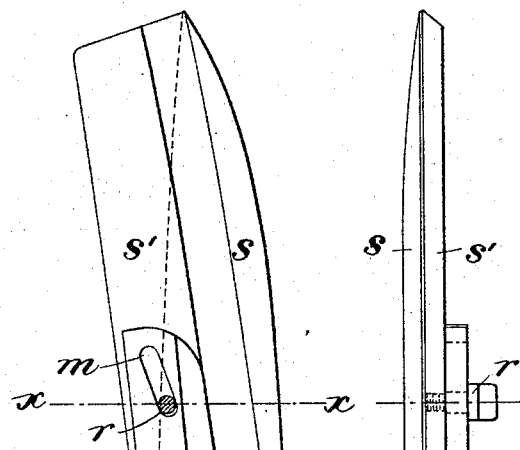
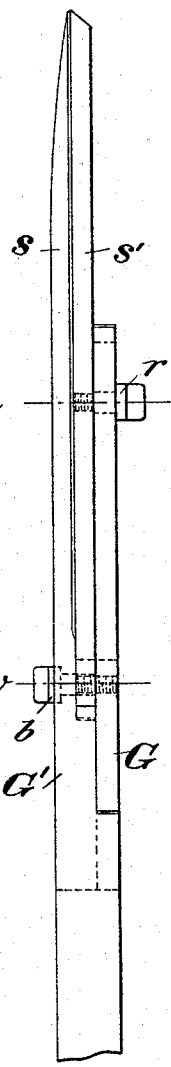
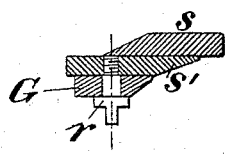
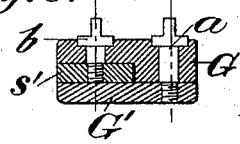
Witnesses:—
D. H. Haywood
Fred Haynes
Inventor:—
Carl Hamann
by attorneys

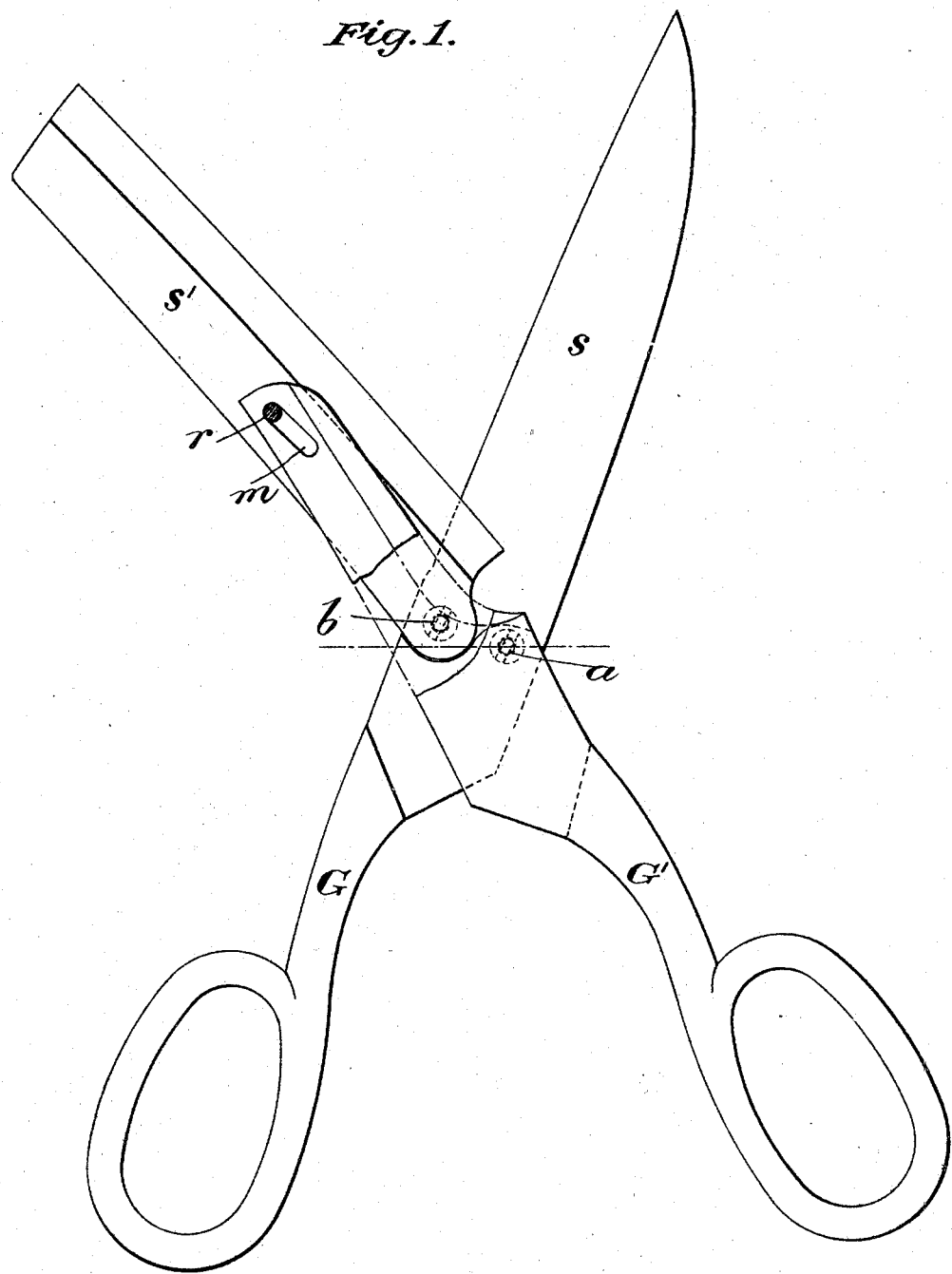

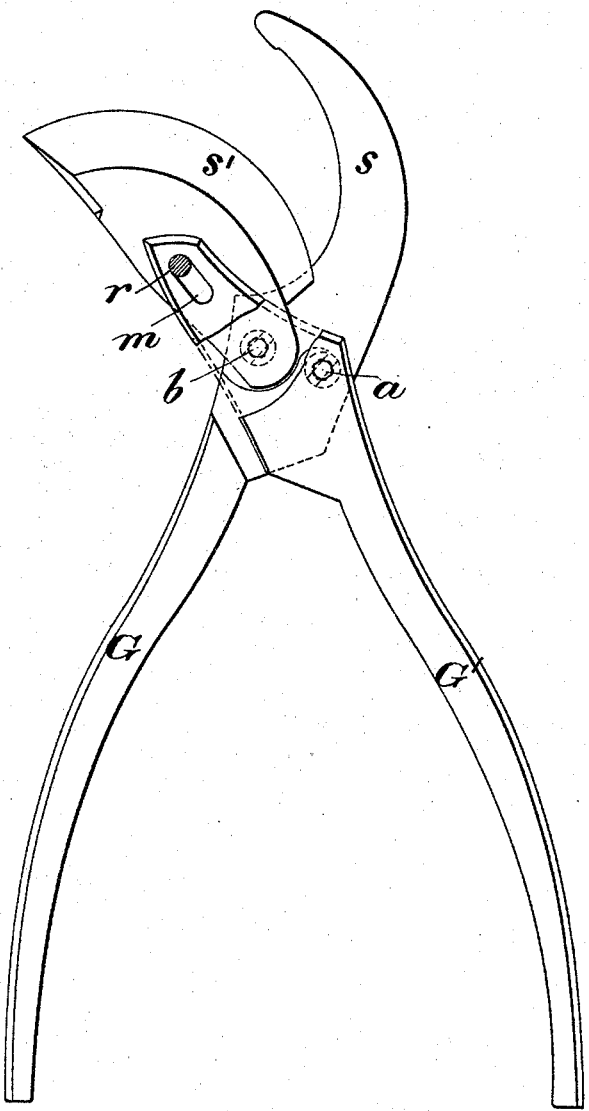

UNITED STATES PATENT OFFICE.

CARL HAMANN, OF REINBECK, GERMANY.

SHEARS.

SPECIFICATION forming part of Letters Patent No. 492,198, dated February 21, 1893.

Application filed June 24, 1891. Serial No. 397,324. (No model.)

*To all whom it may concern:*

Be it known that I, CARL HAMANN, of Reinbeck, in the Empire of Germany, have invented a new and useful Improvement in Scissors or Shears, of which the following is a specification.

This invention relates to scissors or shears of that kind illustrated by my United States Patent No. 434,595, dated August 19, 1890, in which the one blade is in one part with or fixed immovably to the one handle and the other blade is pivoted thereto and is moved by the other handle which is also pivoted to the first blade but not connected to the second blade in one immovable whole.

The improvement consists principally in the relative positions given to the respective pivots by which the second handle and the second blade are severally pivoted to the first handle with blade fixed thereon. Formerly these two pivots were arranged one above the other, that is to say, one nearer than the other to the points of the fixed blades when the latter are closed, the pivot carrying the second handle being usually the lower or farther from the points. According to the present invention these two pivots are arranged side by side, that is to say, they are at the same or approximately the same distance from the points of the blades when the shears are closed, the result of which is that during the closing of the shears while the cut takes place farther and farther from the pivot which connects the blades, the leverage exerted by the handles on the blades is increased and consequently I obtain, especially in the cutting of thick or tough material, considerably greater ease and comfort in the use of the scissors or shears.

The improvement is illustrated in the accompanying drawings in which

Figure 1 is a side view of a pair of tailors' shears open; Fig. 2 a side view of part of the same closed; Fig. 3 an endwise view thereof and Figs. 4 and 5 transverse sections respectively on lines $x\ x$ and $v\ v$ of Fig. 2. Fig. 6 is a side view illustrating the invention as applied to garden shears.

The same letters of reference indicate the same or corresponding parts throughout the figures.

G and G' indicate respectively the two shanks or handles of the shears, the handle G being prolonged to form the fixed blade $s$, while the other blade $s'$, pivoted to the blade $s$, at $b$, is connected to a prolongation of the handle G', by means of a pivot $r$ thereon engaging in a slot $m$, in the said prolongation of the handle G'. The handle G' is pivoted to the blade $s$ at $a$. The improved shears are distinguished from others by the relative positions of the pivots $a$ and $b$, with regard to the general line of length of the shears, these pivots being side by side at the same level or distance from the extremity of the fixed blade $s$, or substantially so, so that when the shears are closed the angle at $b$ formed by the pivots $a\ b\ r$, in this position is at a right angle or nearly so and this angle becomes more and more obtuse as the shears are opened to a greater and greater extent, the change of angle being reversed as the shears are closed. The result of this change of angle during the closing is that the leverage exerted by the handle G' upon the blade $s'$ becomes greater and greater as the handles and blades close and the resistance offered to the cut increases by reason of the cutting point of the blades getting farther from the pivot $b$ upon which the relative movement of the blades takes place. This result is because as the blades close and the pivots $a\ b\ r$ approach the rectangular position the distance of the pivot $r$ in the blade $s$ from the pivot $a$ on which the handle G works diminishes while the distance between the pivots $b$ and $r$ remains the same. This effect can only be obtained by so arranging the pivots that they are side by side in the fixed handle and blade G $s$ and at substantially equal distances from the point of the said blade.

It will be obvious that by this improvement the leverage being least when the resistance is least and increasing gradually as the resistance increases, the shears will be much more easy to the hands of the operator.

Having now particularly described and ascertained my invention, I declare that what I claim is—

The combination in a pair of shears or scissors of a handle provided with a fixed blade, a second handle pivoted to the fixed blade and having a prolongation beyond its pivotal point, a second blade pivoted to the first named blade and having a sliding connection with the prolongation of the second handle, the pivot of the second blade and that of the second handle being arranged side by side and approximately at the same distance from the points of the blades when the latter are closed, substantially as herein described.

CARL HAMANN.

Witnesses:
F. ENGEL,
A. SCHAPER.